(12) United States Patent
Hauser et al.

(10) Patent No.: US 7,350,630 B1
(45) Date of Patent: Apr. 1, 2008

(54) BRAKE CLUTCH MECHANISM

(75) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 206 days.

(21) Appl. No.: 11/199,411

(22) Filed: Aug. 8, 2005

Related U.S. Application Data

(60) Provisional application No. 60/600,559, filed on Aug. 11, 2004.

(51) Int. Cl.
 *F16D 67/02* (2006.01)
 *F16D 21/02* (2006.01)
 *F16D 13/54* (2006.01)

(52) U.S. Cl. ............... 192/13 R; 192/18 R; 192/48.8; 192/70.24; 192/93 R

(58) Field of Classification Search ............. 192/49, 192/70.24
See application file for complete search history.

(56) References Cited

U.S. PATENT DOCUMENTS

| | | | |
|---|---|---|---|
| RE16,266 E * | 2/1926 | Wilson et al. ............ | 192/13 R |
| 2,486,815 A * | 11/1949 | Banker ..................... | 192/17 R |
| 3,386,545 A * | 6/1968 | Hansen .................... | 192/18 R |
| 3,581,600 A | 6/1971 | Holdeman | |
| 3,680,670 A * | 8/1972 | Hansen .................... | 192/18 R |
| 4,088,043 A | 5/1978 | Johnson et al. | |
| 4,548,306 A * | 10/1985 | Hartz ....................... | 192/70.28 |
| 4,895,210 A | 1/1990 | Witzel | |
| 4,951,792 A * | 8/1990 | Egawa ...................... | 192/69.9 |
| 5,012,907 A | 5/1991 | Fujioka et al. | |
| 5,018,592 A | 5/1991 | Buchdrucker | |
| 5,427,217 A | 6/1995 | Patridge | |
| 5,542,307 A | 8/1996 | Hasegawa et al. | |
| 5,913,396 A * | 6/1999 | Hein ........................ | 192/70.28 |
| 6,327,935 B1 * | 12/2001 | Joslin et al. .............. | 74/650 |
| 6,419,035 B1 | 7/2002 | Plamper | |
| 6,942,082 B1 | 9/2005 | Bunnow et al. | |

OTHER PUBLICATIONS

U.S. Appl. No. 10/972,630, filed Oct. 25, 2004.
U.S. Appl. No. 11/076,762, filed Mar. 10, 2005.
U.S. Appl. No. 11/183,662, filed Jul. 18, 2005.
U.S. Appl. No. 11/191,653, filed Jul. 28, 2005.
U.S. Appl. No. 10/965,259, filed Oct. 14, 2004.

* cited by examiner

*Primary Examiner*—Rodney H. Bonck
(74) *Attorney, Agent, or Firm*—Neal, Gerber & Eisenberg LLP

(57) ABSTRACT

An embodiment of the present invention involves a drive apparatus with a housing, a first and second axle mounted in the housing and a ring gear located within the housing. A brake clutch mechanism is located on each axle with a drive clutch assembly for selectively coupling the each axle with the ring gear, a brake assembly for selectively coupling each axle with the housing and a cam block located between the drive clutch assemblies and the brake assemblies to selectively engage each drive assembly or brake assembly. A cam shaft is also rotatably mounted in each cam block and rotatably affixed to the housing.

21 Claims, 8 Drawing Sheets

BRAKE CLUTCH MECHANISM

CROSS REFERENCE

This application claims the priority of U.S. Provisional Patent Application assigned Ser. No. 60/600,559 filed on Aug. 11, 2004, the terms of which are incorporated herein by reference.

BACKGROUND OF THE INVENTION

This invention relates to the use of a clutch system to brake and to drive a vehicle.

SUMMARY OF THE INVENTION

A clutch brake system is disclosed herein. The details of this invention are set forth below in connection with the detailed description of the embodiments.

DETAILED DESCRIPTION OF THE DRAWINGS

Figure 1:
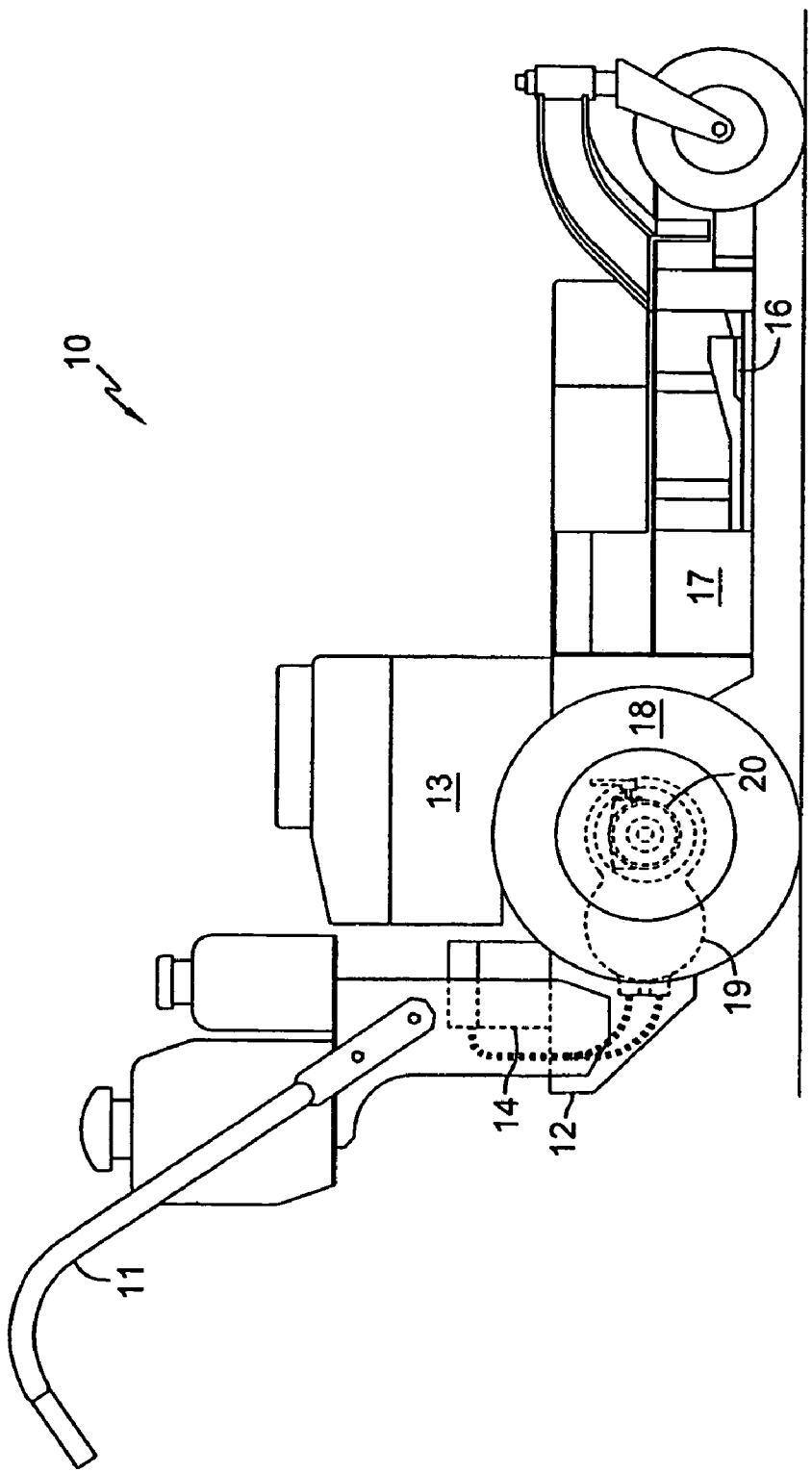
FIG. 1 is a vehicle employing an embodiment of the brake clutch mechanism.

FIG. 1 depicts an exemplary vehicle 10 having a frame 12 on which brake clutch mechanism 20 is mounted. As the configuration of vehicle 10 is well known throughout the art, it will only generally be described herein. Prime mover 13 is also mounted on frame 12 and actuates pump 14, which is hydraulically connected to, and actuates, motor 15 shown in FIGS. 2 and 10, which is located within drive unit 19. Motor 15, in turn, is drivingly engaged to brake clutch mechanism 20. Brake clutch mechanism 20 is drivingly engaged to drive wheels 18 through a pair of axles 25. Vehicle 10 may also have an output device, such as blade 16, which is rotatably mounted in deck 17. A control handle 11 is also mounted to frame 12. It will be understood by one of skill in the art that FIG. 1 depicts an exemplary embodiment rather than a limiting one. Brake clutch mechanism 20 has many applications and is not limited to applications such as vehicle 10, nor is it limited to use with vehicles as there are industrial applications for such units. Neither is brake clutch mechanism 20 limited to application in hydraulic or hydrostatic devices as other drive systems may be used, such as those using clutches to select a gear or variable speed transmissions (VSTs).

Figure 2:
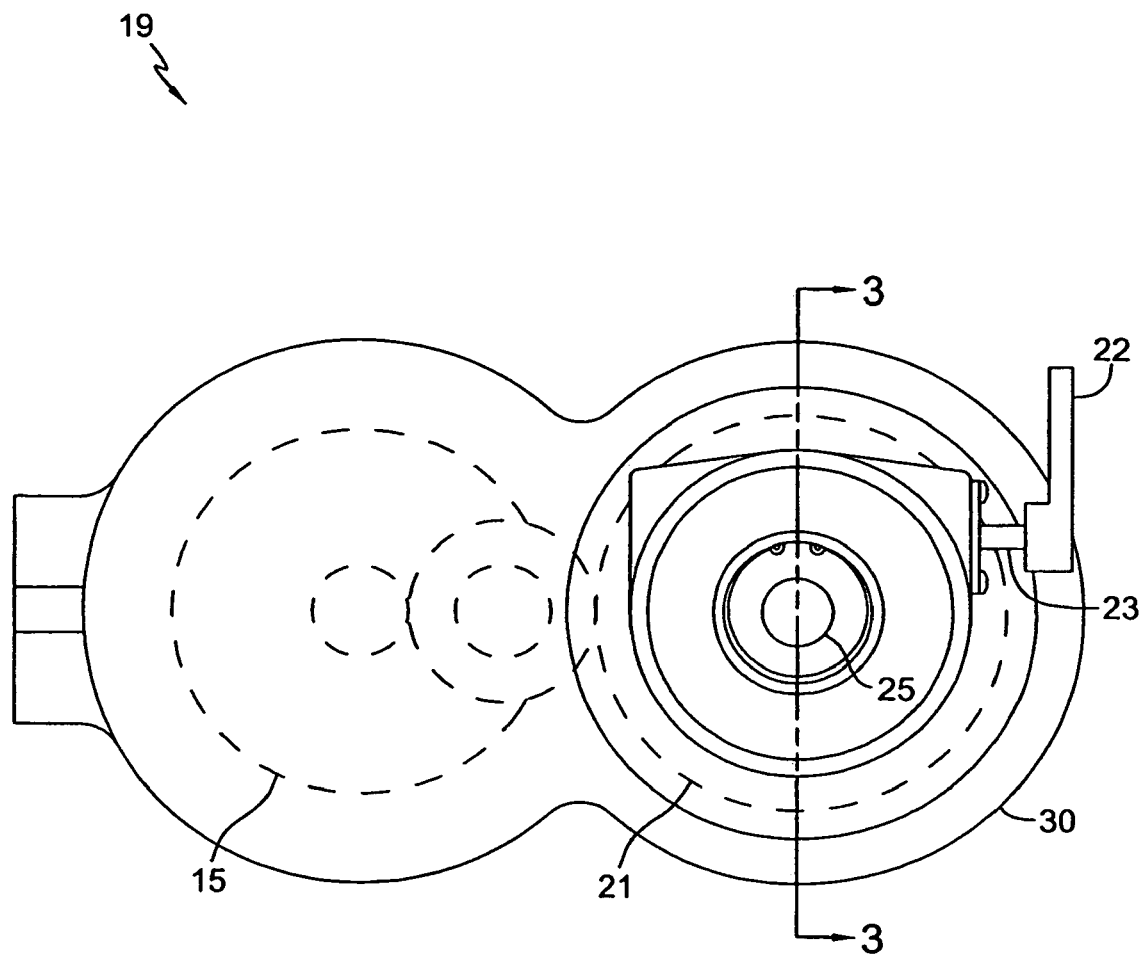
FIG. 2 is an external view of a transmission incorporating an embodiment of the brake clutch mechanism.
Figure 3:
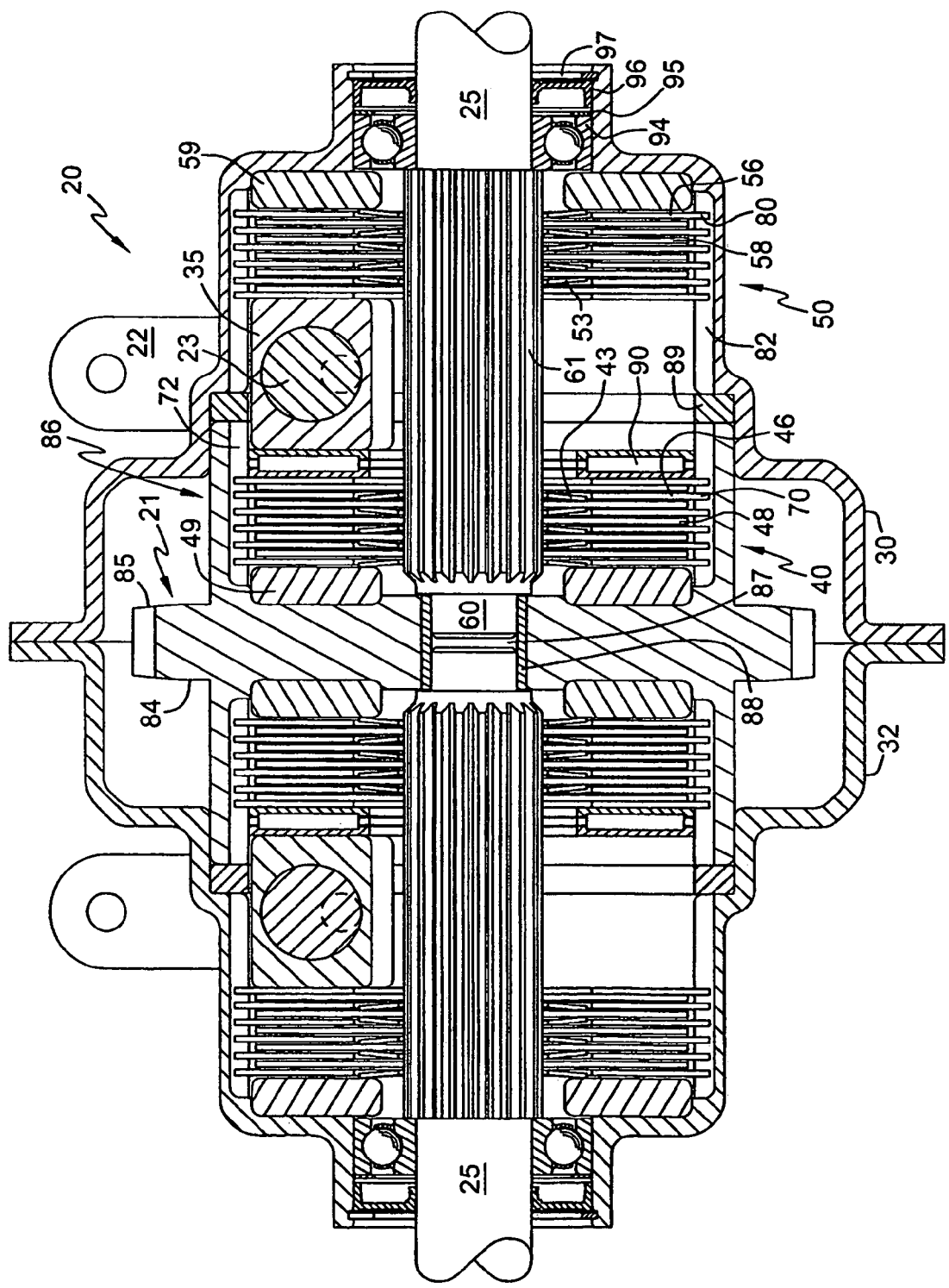
FIG. 3 is a cross-sectional view of an embodiment of the present invention along line 3-3 of FIG. 2, where the clutch brake system is in the neutral position.
Figure 10:
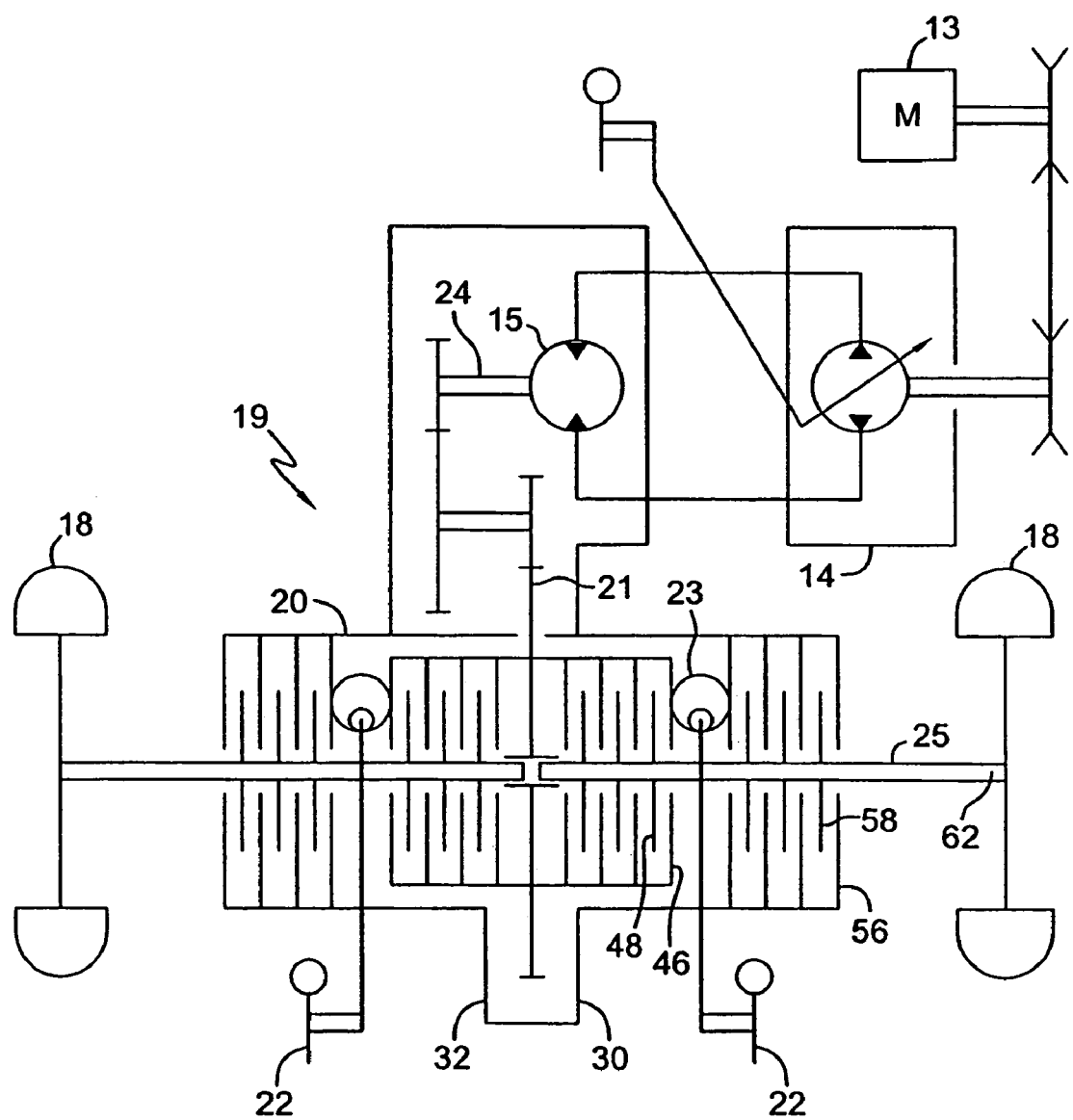
FIG. 10 is a schematic of an embodiment of the present invention.

FIG. 2 depicts an external view of drive unit 19. As hydraulic motors are generally well known in the art, the details of motor 15 are not disclosed herein. For an example of a hydraulic motor, see commonly owned U.S. Pat. No. 5,201,692, which is incorporated herein by reference. Generally, an output shaft 24 of motor 15 is drivingly engaged to ring gear 21, as shown in FIG. 10. An arm 22 is engaged to cam shaft 23, which penetrates housing 30 and engages cam block 35 (as shown in FIG. 3). Arm 22 may be actuated by manipulating controls (not shown) located on control handle 11 that are coupled with arm 22 through a known means, such as cables (not shown).

FIG. 3 is a cross-sectional view of drive unit 19 along line 3-3 in FIG. 2. For clarity, axles 25 are shown complete. In a first embodiment, drive unit 19 is comprised of two housings, housing 30 and housing 32. For convenience, only those elements contained within housing 30 are explained in detail herein. It will be appreciated by those in the art that the same descriptions will apply to the corresponding elements located in housing 32. It will likewise be appreciated by those in the art that the embodiment depicted in FIG. 3 is merely exemplary and in no way is meant to be limiting. By way of example, housings 30 and 32 may be mated along a horizontal parting line. In an additional embodiment, for example, there may only be a single axle located in a housing, and the axle may be engaged at each end to a separate output device, such as wheels 18.

In a first embodiment, ring gear 21, which is comprised of main body 84, a plurality of teeth 85 that extend radially from main body 84, and a pair of cylindrical drums 86 that extend axially from either side of main body 84 is located within, supported by and rotatable with respect to housings 30 and 32. It will be appreciated by those in the art that cylindrical drums 86 are exemplary and not limiting; any similar engaging member is within the scope of this invention. Ring gear 21 also has a central opening 87 that is centrally located on and extends through main body 84. Bearing 88 is located within central opening 87 to receive a first end 60 of axle 25. Bearing ring 89 may optionally be placed between ring gear 21 and housing 30. It will be appreciated that it is within the scope of this invention that ring gear 21 could be supported in other ways, such as by axles 25.

Axle 25, which has a first end 60, a second end 62, and a splined portion 61 therebetween, is located within and rotatable with respect to housing 30. Axle 25 extends through housing 30 and is drivingly engaged at second end 62, which has a smaller radius than splined portion 61 of axle 25, to an output device, such as drive wheels 18 as seen in FIG. 1, or any other known output device. First end 60 of axle 25 similarly has a smaller radius than splined portion 61 of axle 25. First end 60 is inserted into central opening 87 such that splined portion 61 is adjacent to bearing 88. Axle 25 is retained within housing 30 by contact with bearing 94, washer 95, seal 96 and retaining ring 97. It will be appreciated by those in the art that there are numerous ways of retaining axle 25 within housing 30 and the embodiment described above is meant as an exemplary embodiment and not a limiting one.

Figure 4:
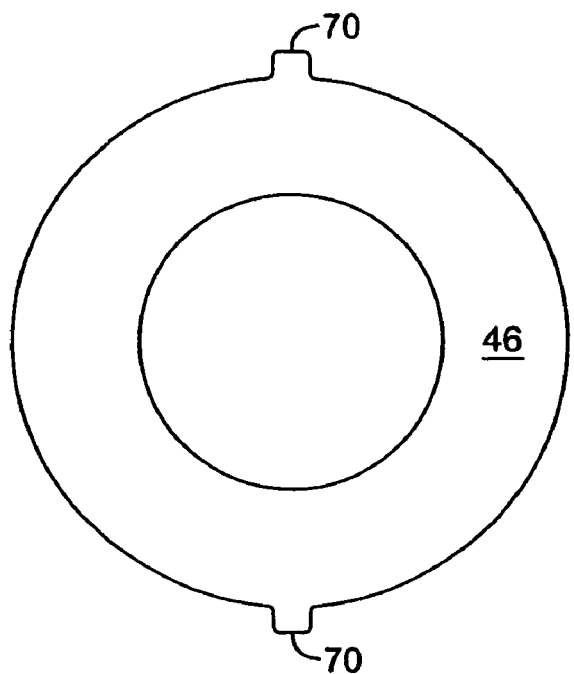
FIG. 4 is an exemplary side view of one of the stators used in an embodiment of the present invention.

Drive clutch assembly 40 is located near first end 60 of axle 25, within cylindrical drum 86. Drive clutch assembly 40 comprises a plurality of drive stators 46, which are mounted within drum 86 of ring gear 21, and drive rotors 48, which are mounted on splined portion 61. Drive stators 46 and drive rotors 48 are slidably movable along cylindrical drum 86 and axle shaft 25, respectively, between a disengaged position, where drive stators 46 and drive rotors 48 are able to rotate independently of each other, and an engaged position, where drive stators 46 and drive rotors 48 are compressed together such that when drive stators 46 are driven by an input to ring gear 21, that drive force will be imparted to axle 25 through drive rotors 48. In the depicted embodiment, tab 70 is formed at each opposite end of each drive stator 46, such as shown in FIG. 4. Each tab 70 fits into a corresponding slot 72 formed on the interior of cylindrical drum 86. It will be appreciated that the embodiment depicted in FIG. 4 is merely exemplary and not limiting. There are numerous known ways to slidably engage stators 46 with ring gear 21.

Figure 5:
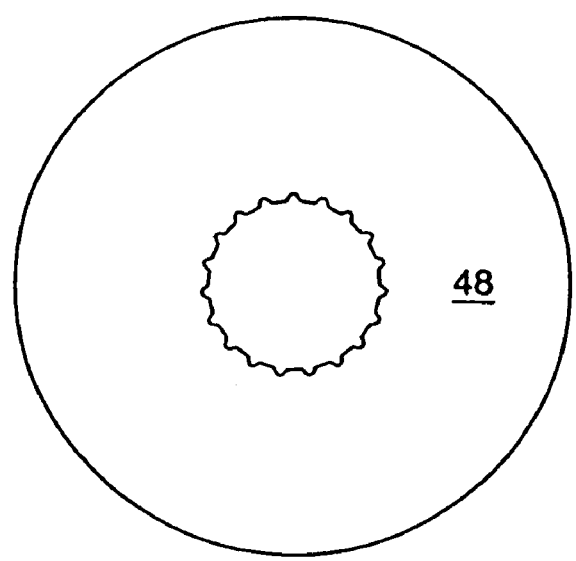
FIG. 5 is an exemplary side view of one of the rotors used in an embodiment of the present invention.

An exemplary drive rotor 48 is depicted in FIG. 5. The structure of drive rotors 48 allows each drive rotor 48 to be splined to axle 25. In an embodiment of a drive clutch assembly, each drive rotor 48 is located between two drive stators 46 in an alternating arrangement. A plurality of restoring springs 43 are interspaced between drive rotors 48 to bias each drive rotor 48 into the disengaged position. A pad 49 may optionally be positioned adjacent to ring gear 21 and adjacent to the inner most drive rotor 48 to provide a flat thrust surface when drive stators 46 and drive rotors 48 are moved into the engaged position.

Brake assembly 50 is located in housing 30 near where axle 25 exits housing 30. Brake assembly 50 comprises a plurality of brake stators 56, which are slidably mounted in groove 82 formed in housing 30, and brake rotors 58, which are slidably mounted on splines 61 formed on axle shaft 25. Brake stators 56 and brake rotors 58 are slidably movable between a disengaged position, where brake rotors 58 are able to rotate freely with respect to brake stators 56, and an engaged position, where brake stators 56 and brake rotors 58 are compressed together such that any motion of axle shaft 25 is resisted by the contact between brake rotors 58 and brake stators 56.

In the depicted embodiment, brake stators 56 are identical to drive stators 46. A tab 80 is formed at each opposite end of brake stators 56. Each tab 80 fits into a corresponding slot 82 formed on the interior of housing 30. It will be appreciated that this uniformity is exemplary and not limiting; brake stators 56 need not be identical to drive stators 46.

In the depicted embodiment, the structure of brake rotor 58 is identical to drive rotor 48. It will be appreciated that this uniformity is exemplary and not limiting; brake rotors 58 need not be identical to drive rotors 48. In an embodiment of brake assembly 50, each brake rotor 58 is splined to axle 25. Each brake rotor 58 is located between two brake stators 56 in an alternating arrangement. A plurality of restoring springs 53 are interspaced between brake rotors 58 to bias each brake rotor 58 into the disengaged position. A pad 59 may optionally be positioned in housing 30 adjacent to the outer most brake stator 56.

Cam block 35 is located within housing 30 and is movable with respect to housing 30 and ring gear 21 between any one of three positions. In the first position, cam block 35 is not engaged with either drive clutch assembly 40 or brake assembly 50. In the second position, cam block 35 is moved toward, and engaged with, drive clutch assembly 40. In the third position, cam block 35 is moved toward, and engaged with, brake assembly 50.

Figure 6:
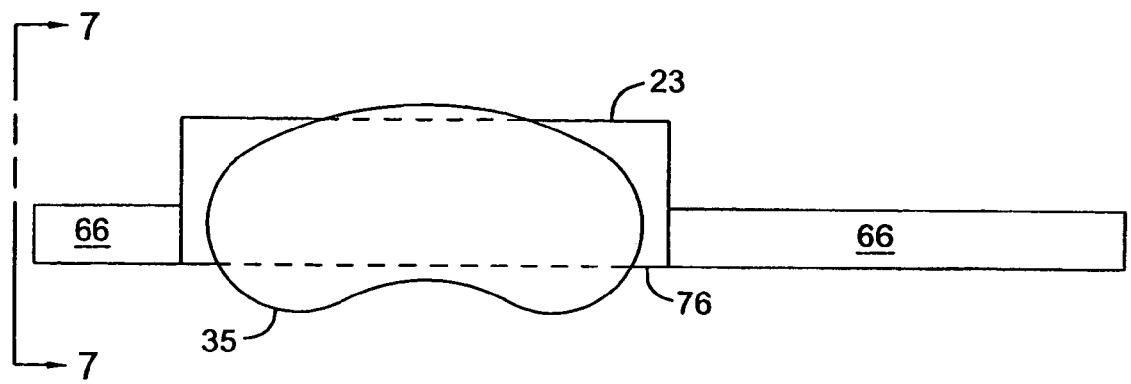
FIG. 6 is a side view of the cam block and cam shaft.
Figure 7:
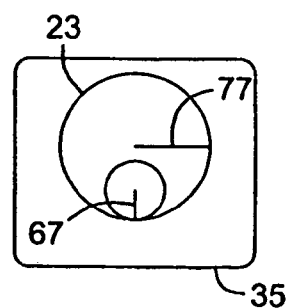
FIG. 7 is a front view of the cam block, as viewed along line 7-7 of FIG. 6.

In a first embodiment, cam shaft 23 is rotatably mounted in cam block 35. Cam shaft 23 is also rotatably mounted in housing 30 between brake assembly 50 and drive assembly 40. One end of cam shaft 23 extends through housing 30 and engages arm 22 as shown in FIG. 2. The characteristics of cam shafts are well known in the art, and, therefore, will not be discussed in detail. Generally, cam shaft 23 has a first section 66 and a second section 76, wherein radius 77 of second section 76 is larger than radius 67 of first section 66 (as shown in FIGS. 6 and 7). The size and relationship of radius 67 and radius 77 are chosen considering both the required force to actuate drive clutch assembly 40 and brake assembly 50, as well as the configuration of the linkage attached to arm 22; thus the representations herein are illustrative only. The axes of first section 66 and second section 76 are axially parallel but offset from one another. Cam shaft 23 rotates about the center of first section 66, and cam block 35 is mounted on second section 76.

FIG. 3 depicts a first position of cam block 35, which corresponds to vehicle 10 being in neutral. In the first position, ring gear 21 and drive stators 46 rotate independently of housing 30, axle 25 and drive rotors 48, and no force is transmitted to axle 25. Likewise, axle 25, drive rotors 48 and brake rotors 58 may rotate independently of housing 30, ring gear 21, drive stators 46 and brake stators 56.

Figure 8:
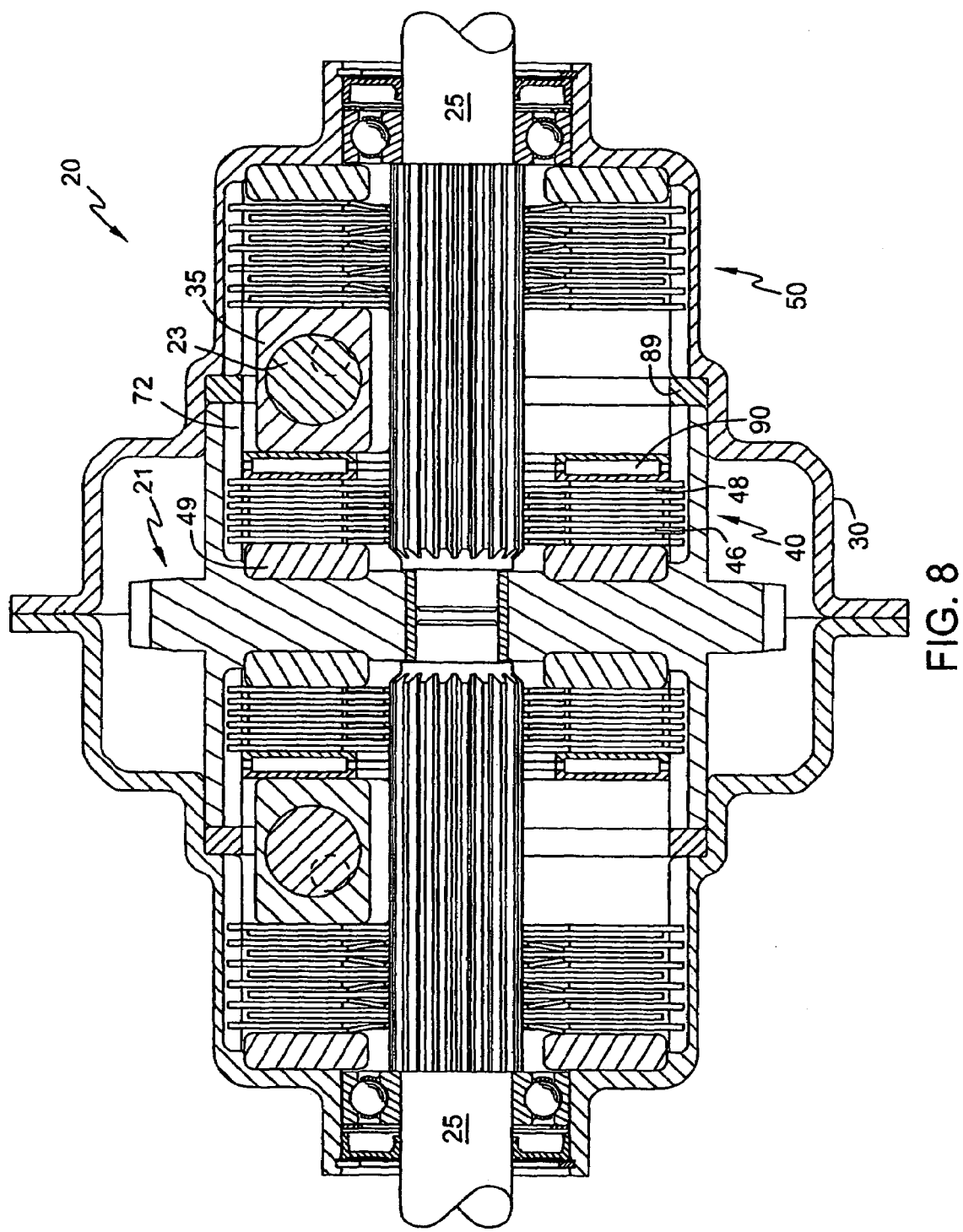
FIG. 8 is a cross-sectional view of an embodiment of the present invention along the line 3-3 of FIG. 2, where the clutch brake system is in the drive position.

In the embodiment depicted in FIG. 3, cam shaft 23 may be rotated counterclockwise, which moves cam block 35 to a second position, which corresponds to vehicle 10 being in drive, as shown in FIG. 8. It will be understood that cam shaft 23 located in housing 32 must be rotated clockwise to achieve the same result. In this second position, cam block 35 thrusts against bearing 90, which is positioned between cam block 35 and drive clutch assembly 40. As cam block 35 moves against bearing 90, bearing 90 thrusts against drive clutch assembly 40. As drive clutch assembly 40 receives the thrust force of cam block 35, drive stators 46 and drive rotors 48 are compressed and pressed against pad 49. In this compressed condition, friction between drive stators 46 and drive rotors 48 couples axle 25 with ring gear 21, thus transmitting the rotational force from ring gear 21 to axle 25 and causing axle 25 to rotate with ring gear 21. In this configuration, ring gear 21, drive stators 46, drive rotors 48, brake rotors 58 and axle 25 rotate together and independent of housing 30 and brake stators 56.

Figure 9:
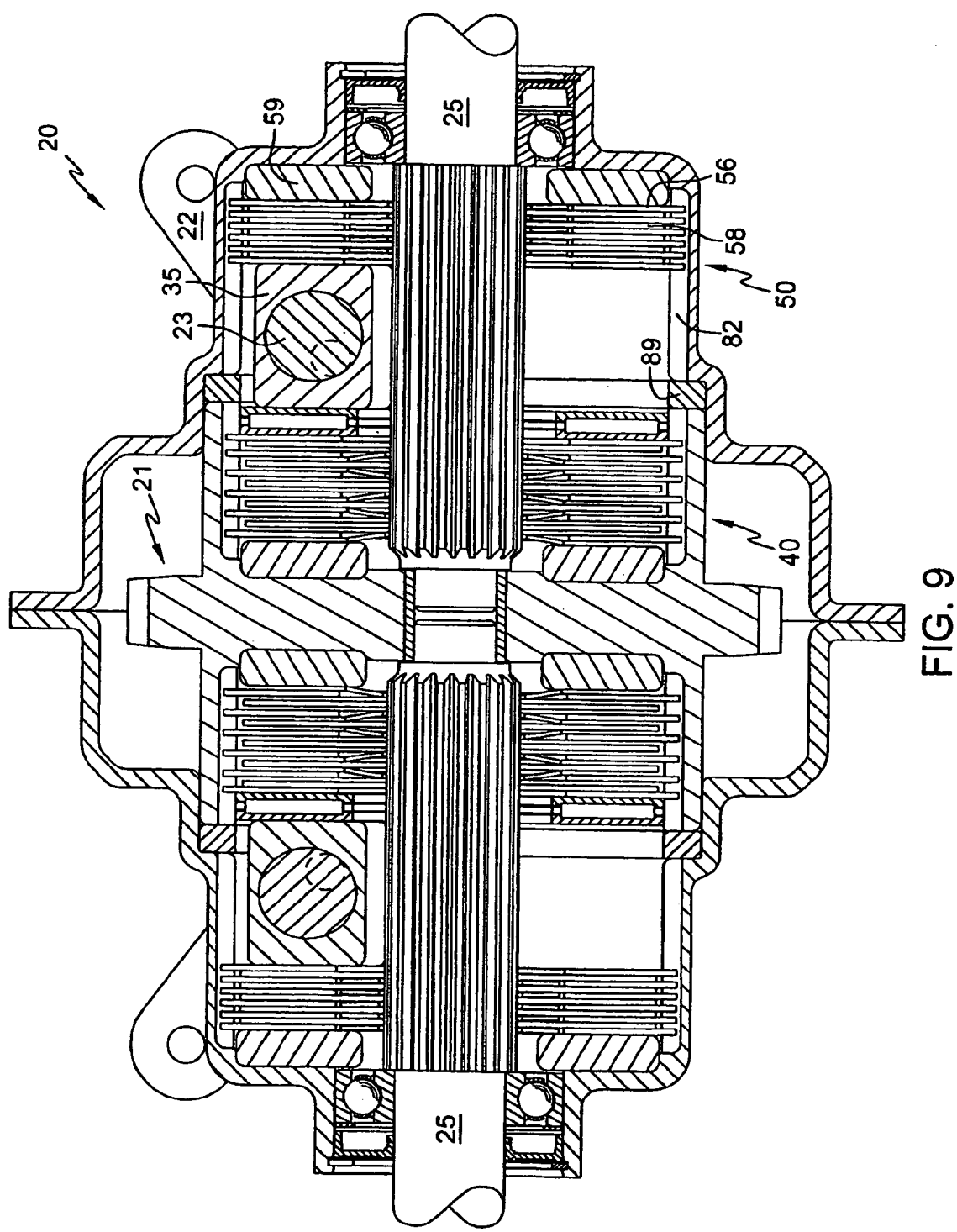
FIG. 9 is a cross-sectional view of an embodiment of the present invention along the line 3-3 of FIG. 2, where the clutch brake system is in the brake position.

In the embodiment depicted, cam shaft 23 may be rotated clockwise from the position shown in FIG. 4, thus moving cam block 35 to a third position, which corresponds to vehicle 10 being braked, as shown in FIG. 9. It will be understood that cam shaft 23 located in housing 32 must be rotated counterclockwise to achieve the same result. In this third position, cam block 35 engages, and thus compresses, brake assembly 50 against pad 59. In this compressed condition, friction between brake stators 56 and brake rotors 58 couples axle 25 with housing 30, thus preventing axle 25 from rotating with respect to housing 30. When cam block 35 is in the third position, ring gear 21 and drive stators 46 can rotate independently of drive rotors 48, brake rotors 58, brake stators 56 and axle 25.

When cam block 35 moves from the second position to either the first or third position, restoring springs 43 decompress drive assembly 40, and return drive stators 46 and drive rotors 48 to their respective disengaged positions. This decompression decouples axle 25 from ring gear 21, and allows both to rotate independently from one another. Likewise, when cam block 35 moves from the third position to either the first or second position, restoring springs 53 decompress brake assembly 50, and return brake stators 56 and brake rotors 58 to their respective disengaged positions. This decompression decouples axle 25 from housing 30.

As described above, an embodiment of drive unit 19 comprises two housings, housing 30 and housing 32. It will be appreciated by those in the art that the elements contained within the two housings may be engaged independently from one another. By way of example, engagement of drive clutch assembly 40 located in housing 30 as described above does not necessitate the engagement of the drive clutch assembly 40 located in housing 32. Thus, by engaging right drive clutch assembly 40 only, a driven vehicle may be steered toward the left. Similarly, engaging the left drive clutch assembly 40 only will cause a driven vehicle to drive toward the right. Engagement of the opposite brake from an engaged drive clutch, such as the left brake 50 while engaging the right drive 40, may enhance steering in some operating conditions. It will be appreciated by those in the art that in another embodiment, corresponding elements in the two housings may only be engaged concurrently with, and not independently from, one another.

It will also be appreciated by those in the art that the use of cam block 35 is exemplary and not limiting. By way of example, another embodiment of the present invention teaches that the movement of a simple cam shaft, like cam shaft 23 without cam block 35, could achieve the same result if it were positioned in housing 30 such that drive clutch assembly 40 and brake assembly 50 were positioned in proximity to second section 76 of shaft 23.

While specific embodiments of the invention have been described in detail, it will be appreciated by those skilled in the art that various modifications and alternatives to those details could be developed in light of the overall teachings of the disclosure. Accordingly, the particular arrangements disclosed herein are meant to be illustrative only and not limiting as to the scope of the invention which is to be given the full breadth of the appended claims and any equivalents thereof.

What is claimed is:

1. A drive apparatus comprising:
    a housing;
    first and second axles mounted in the housing;
    a ring gear located within the housing;
    a first brake clutch mechanism located within the housing and comprising:
        a first drive clutch assembly for selectively coupling the first axle to the ring gear;
        a first brake assembly for selectively coupling the first axle to the housing;
        a first cam block located between the first drive clutch assembly and the first brake assembly and movable with respect to the housing, wherein the first cam block engages the first drive clutch assembly when the first cam block is moved in a first direction, thereby coupling the first axle to the ring gear, and wherein the first cam block engages the first brake assembly when the first cam block is moved in a second direction, thereby coupling the first axle to the housing; and
        a first cam shaft rotatably mounted in the first cam block and extending out of the housing; and
    a second brake clutch mechanism located within the housing and comprising:
        a second drive clutch assembly for selectively coupling the second axle to the ring gear;
        a second brake assembly for selectively coupling the second axle to the housing;
        a second cam block located between the second drive clutch assembly and the second brake assembly and movable with respect to the housing, wherein the second cam block engages the second drive clutch assembly when the second cam block is moved in a first direction, thereby coupling the second axle to the ring gear, and wherein the second cam block engages the second brake assembly when the second cam block is moved in a second direction, thereby coupling the second axle to the housing; and
        a second cam shaft rotatably mounted in the second cam block and extending out of the housing.

2. The drive apparatus as set forth in claim 1, further comprising a first thrust bearing located between the first cam block and the first drive clutch assembly, and a second thrust bearing located between the second cam block and the second drive clutch assembly.

3. The drive apparatus as set forth in claim 1, wherein each drive clutch assembly comprises:
    a plurality of drive stators slidably engaged to the ring gear;
    a plurality of drive rotors, wherein each drive rotor is slidably mounted on the corresponding axle and located between two drive stators; and
    at least one spring mechanism interspaced between each of the drive rotors.

4. The drive apparatus as set forth in claim 3, wherein each spring mechanism is a Belleville washer.

5. The drive apparatus as set forth in claim 3, wherein the ring gear comprises:
    a main body having a first side, a second side and an edge;
    a plurality of teeth located on the edge of the main body and extending radially therefrom;
    a first cylindrical drum extending axially from the first side of the main body; and
    a second cylindrical drum extending axially from the second side of the main body.

6. The drive apparatus as set forth in claim 5, wherein each drive stator of the first drive clutch assembly is slidably engaged to the first cylindrical drum.

7. The drive apparatus as set forth in claim 6, wherein each drive stator of the second drive clutch assembly is slidably engaged to the second cylindrical drum.

8. The drive apparatus as set forth in claim 1, wherein each brake assembly comprises:
    a plurality of brake stators slidably engaged to the housing;
    a plurality of brake rotors, wherein each brake rotor is slidably mounted on the corresponding axle and located between two brake stators; and
    at least one spring mechanism interspaced between each of the brake rotors.

9. The drive apparatus as set forth in claim 8, wherein each spring mechanism is a Belleville washer.

10. A brake clutch mechanism located within a drive assembly having a housing and a drive gear located within the housing, the brake clutch mechanism comprising:
    an engaging member driven by an outside force;
    an axle mounted in and rotatable with respect to the engaging member;
    a drive assembly for selectively coupling the axle with the engaging member;
    a brake assembly for selectively coupling the axle with an external structure; and
    an actuating structure located between the drive assembly and the brake assembly, the actuating structure comprising a cam block located within and moveable with respect to the housing and a cam shaft rotatable mounted in the housing and rotatable mounted within the cam block, whereby rotation of the cam shaft moves the cam block at least longitudinally parallel to the axis of the axle, wherein the actuating structure is selectively engagable with the drive assembly to couple the drive assembly to the axle and the engaging member to transmit force from the engaging member to the axle, and wherein the actuating structure is alternatively selectively engagable with the brake assembly to couple the brake assembly to the external structure and the axle to prevent the axle from rotating with respect to the external structure.

11. The brake clutch mechanism as set forth in claim 10, wherein the engaging member is integrally formed on the drive gear.

12. The brake clutch mechanism as set forth in claim 10, wherein the external structure is formed on the housing.

13. The brake clutch mechanism as set forth in claim 10, wherein a thrust bearing is located between the actuating structure and the drive assembly.

14. A drive apparatus for use in a vehicle, the drive apparatus comprising:
   a housing;
   a ring gear located within the housing and engaged to a prime mover external to the housing;
   an axle located within the housing and rotatable with respect to the housing and the ring gear;
   a drive clutch assembly mounted on the axle, the drive clutch assembly comprising:
      at least one drive stator slidably engaged to the ring gear; and
      at least one drive rotor slidably mounted on the axle and located proximate to the at least one drive stator;
   a brake assembly mounted on the axle, the brake assembly comprising:
      at least one brake stator slidably engaged to the housing; and
      at least one brake rotor slidably mounted on the axle and located proximate to the at least one brake stator; and
   an actuating structure mounted in, and selectively movable with respect to, the housing, the actuating structure comprising a cam block movable with respect to the housing, and a cam shaft rotatable mounted in the cam block and rotatably affixed to the housing, wherein the actuating structure is selectively engagable with the drive clutch assembly to couple the drive clutch assembly to the axle and the drive gear to transmit force from the drive gear to the axle, and wherein the actuating structure is alternatively selectively engagable with the brake assembly to couple the brake assembly to the housing and the axle to prevent the axle from rotating with respect to the housing.

15. The drive apparatus as set forth in claim 14, wherein the drive clutch assembly comprises a plurality of drive stators.

16. The drive apparatus as set forth in claim 15, wherein the drive clutch assembly comprises a plurality of drive rotors, wherein each drive rotor is located between two drive stators.

17. The drive apparatus as set forth in claim 16, further comprising at least one spring mechanism interspaced between each of the drive rotors.

18. The drive apparatus as set forth in claim 14, wherein the brake assembly comprises a plurality of brake stators.

19. The drive apparatus as set forth in claim 18, wherein the brake assembly comprises a plurality of brake rotors, wherein each brake rotor is located between two brake stators.

20. The drive apparatus as set forth in claim 19, further comprising at least one spring mechanism interspaced between each of the brake rotors.

21. The drive apparatus as set forth in claim 14, wherein the cam block is located between the drive clutch assembly and the brake assembly.

* * * * *